United States Patent Office 3,364,109
Patented Jan. 16, 1968

3,364,109
HYDROXYQUINOLINE - STABILIZED BIOCIDAL ORGANIC PHOSPHORUS PESTICIDES IN FINELY DISPERSED SILICIC ACID
Marc Haering, Frenkendorf, Switzerland, assignor to Ciba Limited, Basel, Switzerland, a Swiss company
No Drawing. Continuation-in-part of application Ser. No. 376,225, June 18, 1964. This application Sept. 17, 1965, Ser. No. 488,263
Claims priority, application Switzerland, June 21, 1963, 7,772/63
5 Claims. (Cl. 167—42)

ABSTRACT OF THE DISCLOSURE

Pesticidal compositions of prolonged active life and enhanced stability are provided by combining a biocidal organic phosphorus compound, particularly dimethyl dichlorovinyl phosphate, a finely dispersed silicic acid as the vehicle and 8-hydroxyquinoline or 2,4-dihydroxyquinoline in the proportions of 40%:60% to 60%:40% of phosphorus compound to silicic acid and 1–5% by weight of the hydroxyquinoline to phosphorus compound.

The compositions are useful in pest control, generally in plant protection and in hygiene. They are also useful as anthelmintics.

---

This application is a continuation-in-part of my copending application Ser. No. 376,225 filed June 18, 1964, now abandoned.

It is known that pesticides that contain biocidal organic phosphoric acid esters, for example dimethyl dichlorovinyl phosphate or a derivative thereof, as active ingredient and finely dispersed silicic acid as vehicle, gradually lose their potency, for example during storage. The improvement of the active life of such preparations is therefore a problem of extreme practical importance.

The present invention provides a process for the manufacture of a pesticidal preparation having an extended active life, or an increased stability, which comprises incorporation into a preparation containing as active ingredient a biocidal organic phosphorus compound, especially dimethyl dichlorovinyl phosphate or a derivative, preferably a homologue, thereof, and in addition finely dispersed silicic acid as vehicle, a hydroxyquinoline, preferably 8-hydroxyquinoline or 2,4-dihydroxyquinoline, as a further constituent.

According to a preferred variant of the present invention, for example, the active ingredient is mixed with 8-hydroxyquinoline or 2,4-dihydroxyquinoline and this mixture is mixed with the previously dried silicic acid vehicle.

According to another preferred variant of the present invention, a silicic acid vehicle is used which has been previously dried at a temperature ranging from 100° to 150° C., preferably from 100° to 120° C. under a reduced pressure, preferably below 60 mm. Hg.

The present invention is especially concerned with the prolonging of the active life or increasing the stability of pesticides of the kind defined above that contain as active ingredient a compound from one of the following groups of formulae:

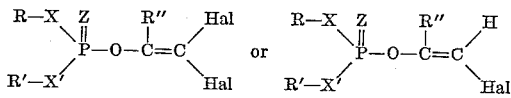

where R and R' each represents an alkyl radical containing 1 to 5 carbon atoms; R" represents a hydrogen atom or a methyl group; X, X' and Z each represents an oxygen or a sulfur atom and Hal represents a halogen atom, preferably a chlorine or bromine atom, more especially dimethyl dichlorovinyl phosphate (DDVP) or diethyl dichlorovinyl phosphate, di-n-propyl and di-isopropyl dichlorovinyl phosphate; di-secondary butyl dichlorovinyl phosphate, di-n-butyl dichlorovinyl phosphate, di-isobutyl dichlorovinylphosphate, di-amyl dichlorovinyl phosphates, dimethyl- or diethyl dibromovinyl phosphate, methylethyl dichlorovinyl phosphate; furthermore esters derived from the above formulae by saturation of the double bond with halogen atoms, for example, the bromination of DDVP, dimethyl-1,2-dibromo-2,2-dichloroethyl phosphate; furthermore compounds of the formula (II)

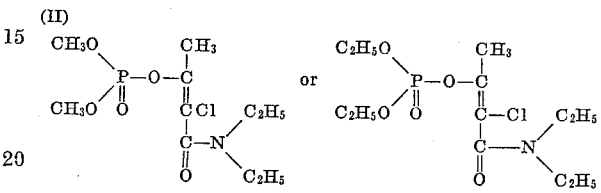

Apart from the process referred to above, the present invention provides a pesticidal preparation having a prolonged activity and enhanced stability, containing as active ingredient a biocidal organic phosphorus compound, more especially dimethyl dichlorovinyl phosphate or a derivative, preferably a homologue, thereof, as well as finely dispersed silicic acid as vehicle and, as further ingredient, a hydroxyquinoline, preferably 8-hydroxyquinoline or 2,4-dihydroxyquinoline.

The proportion by weight of biocidal phosphoric acid ester:silicic acid:hydroxyquinoline are advantageously as follows:

(a) The proportion by weight of biocidal phosphoric acid ester to silicic acid may vary within the limits of 20%:80% to 80%:20%, advantageously between 40%:60% to 60% to 40%, that is to say, a composition may contain, for example, 40% of biocidal phosphoric acid and 60% of silicic acid or any ratio up to the inverse proportion, in other words, a composition may contain 60% of biocidal phosphoric acid ester and 40% of silicic acid.

(b) The hydroxyquinoline may be present in an amount of 0.5 to 10%, calculated on the biocidal phosphoric acid ester although it is of advantage to use, for every 100 g. of biocidal phosphoric acid ester about 1 to 5 g. of hydroxyquinoline, i.e. about 1 to 5% by weight, calculated on the biocidal phosphoric acid ester.

If desired, the preparations of this invention may contain one of the following additional ingredients: Active carbon, antioxidants, solvents, diluents, dispersants, wetting agents, adhesives or further pesticides.

As antioxidants, which may be additionally incorporated with the preparations improved according to this invention, there may be mentioned the usual aliphatic and aromatic oxidation inhibitors, for example 1,2-propyleneglycol, 2,6-di-tertiary butylphenol, 2,6-di-tertiary butyl-para-cresol, butyl hydroxyanisole, bis-(3,5-di-tertiary butyl - 4 - hydroxyphenyl)methane, 3,5-di-tertiary butyl - 4 - hydroxybenzyl alcohol, 3,5-di-isopropyl-4-hydroxy-benzyl alcohol and also simpler phenolic compounds, for example hydroquinone, resorcinol or pyrogallol; furthermore para-tertiary butylpyrocatechol, gallic acid esters, especially gallic acid ethyl ester.

When the preparations of the invention are used in the form of casting or dusting agents, there may be incorporated with them as further ingredients solid vehicles, for example talcum, kaoline, bentonite, cork meal or wood meal and other materials of vegetable origin. It is also very advantageous to manufacture the preparations in granulated form.

The improved pesticides of the invention may be used in general pest control, in plant protection and in hygiene, for example to combat harmful insects, acarides, nematodes or molluscs. The new preparations—especially those which contain as active ingredient a homologue of DDVP—are also suitable for use as anthelmintics.

Furthermore, the improved pesticides of the invention are distinguished by a particularly favourable relationship between their effect against the pests and their toxicity towards warm-blooded beings. They act against the various stages of development of insects and acarides, such as their ovae, larvae and imagines, both as contact and stomach poisons.

The following example illustrates the invention:

*Example*

(a) 1.2 parts by weight of 8-hydroxyquinoline were dissolved in 120 parts by weight of dimethyl dichlorovinyl phosphate. The resulting solution was mixed with 100 parts by weight of finely dispersed silicic acid (hydratized silicon dioxide; marketed under the trade name "Hisil"; dried at about 120° C. under 50 mm. Hg pressure) and stored in tightly closed jars for 3 months at 35° C., whereupon the loss in percent of dimethyl dichlorovinyl phosphate was measured iodometrically.

(b) As comparative preparation "K₁" there was used a mixture, stored for 2 months under identical conditions, of 50 parts by weight of the silicic acid vehicle described above ("Hisil," trademark), which had been previously dried at about 120° C. under a vacuum of 50 mm. Hg, and 65 parts by weight of dimethyl dichlorovinyl phosphate.

(c) As comparative preparation "K₂" there was used a mixture stored for 2 months under identical conditions, of 50 parts by weight of the commercial silicic acid vehicle described above ("Hisil," trademark) without preliminary drying, and 65 parts by weight of dimethyl dichlorovinyl phosphate.

The result is shown in the following table:

TABLE I

|  | Loss of active ingredient after storing at 35° C | |
|---|---|---|
|  | For 2 months | For 3 months |
| K₁ | 8.3% | Not measured. |
| K₂ | 17.7% | Do. |
| 8-hydroxyquinoline | 0% | 0%. |

When the 8-hydroxyquinoline was replaced by 2,4-dihydroxyquinoline, practically the same good stabilizing effect was obtained.

A very good stabilizing effect and a considerably extended active liefe were also obtained with the following mixture:

| | Grams |
|---|---|
| Dimethyl-dichlorovinylphosphate | 26 |
| Acetic anhydride | 5 |
| Silicic acid vehicle ("Zeosil," trademark) | 20 |
| 2,4-dihydroxyquinoline | 0.24 |

What is claimed is:

1. A pesticidal composition having a prolonged active life and an enhanced stability which comprises as active ingredient (a) compound of the formula

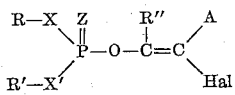

wherein Hal represents halogen, R and R' each represents an alkyl radical containing at most 5 carbon atoms, R" represents a member selected from the group consisting of hydrogen and methyl, X, X' and Z each represents a member selected from the group consisting of oxygen and sulfur, and A represents a member selected from the group consisting of hydrogen, chlorine and bromine, (b) finely dispersed silicic acid as vehicle and a member selected from the group consisting of 8-hydroxyquinone and 2,4-dihydroxyquinoline and wherein the weight proportion of (a) to (b) is from 40%:60% to 60%:40% and the hydroxyquinoline is present in an amount of 1% to 5% of the weight of (a).

2. A composition according to claim 1 in which the active ingredient is dimethyl dichlorovinyl phosphate.

3. A composition according to claim 1 in which the hydroxyquinoline is 8-hydroxyquinoline.

4. A composition according to claim 1 wherein the hydroxyquinoline is 2,4-dihydroxyquinoline.

5. A composition according to claim 4 in which the active ingredient is dimethyl dichlorovinyl phosphate.

References Cited

UNITED STATES PATENTS

| 2,387,591 | 10/1945 | Kolb | 167—33 |
| 2,799,615 | 7/1957 | Heymons et al. | 167—33 |
| 3,093,536 | 6/1963 | Loeffler | 167—22 |
| 3,097,128 | 7/1963 | Sprinkle et al. | 167—22 |
| 3,275,499 | 9/1966 | Kassler et al. | 167—22 |
| 3,278,369 | 10/1966 | Haering | 167—22 |

LEWIS GOTTS, *Primary Examiner.*

S. K. ROSE, *Assistant Examiner.*